United States Patent [19]
Stahovic et al.

[11] Patent Number: 5,989,328
[45] Date of Patent: Nov. 23, 1999

[54] NON-SKID COMPOSITION

[75] Inventors: Robert Stahovic, Cambridge Springs, Pa.; Anthony J. Pecora, Tucson, Ariz.

[73] Assignee: BTG, a Partnership

[21] Appl. No.: 09/111,988

[22] Filed: Jul. 8, 1998

[51] Int. Cl.⁶ ........................................................ C09K 3/14
[52] U.S. Cl. .................... 106/36; 427/368; 427/388.1; 427/389.7; 427/393; 427/393.6; 523/149; 523/150
[58] Field of Search ............................... 106/36; 523/149, 523/150; 427/368, 429, 388.1, 389.7, 393, 393.6

[56] References Cited

U.S. PATENT DOCUMENTS

| | | | |
|---|---|---|---|
| 4,019,912 | 4/1977 | Augustin | 106/36 |
| 4,990,188 | 2/1991 | Micek et al. | 106/36 |
| 5,456,744 | 10/1995 | Fattor | 106/36 |

OTHER PUBLICATIONS

Chemical Abstract No. 104:173342, abstract of Japanese Patent Specification No. 60–204654 (Oct. 1985).
Chemical Abstract No. 122:87779, abstract of Japanese Patent Specification No. 06–271344 (Sep. 1994).

*Primary Examiner*—Anthony Green
*Attorney, Agent, or Firm*—Charles L. Lovercheck; Wayne L. Lovercheck

[57] ABSTRACT

The invention provides a material for making non-skid coatings, comprising: a particulate composition including wollastonite particles, cellulose particles, and diatomaceous earth particles. The invention provides a method of forming a non-skid coated substrate, comprising: providing a material for making non-skid coatings, comprising: particulate composition, the particulate composition comprising wollastonite particles, cellulose particles, and diatomaceous earth particles, providing liquid composition comprises water, fungicide, defoamer, ultra-violet light absorber and polymeric material, mixing the particulate composition and the liquid composition to form a coating composition, coating the coating composition onto a surface of a substrate to form a non-skid coated substrate.

16 Claims, No Drawings

NON-SKID COMPOSITION

The invention relates to non-skid coatings. The invention provides compositions and methods for providing non-skid coatings on wood, metal, glass and ceramic surfaces. Such coatings reduce the risk of injury from slipping and falling, on such surfaces particularly when they are wet.

It is an object of the invention to provide a material for making non-skid coatings, comprising a particulate composition including wollastonite particles, cellulose particles, and diatomaceous earth particles.

It is an object of the invention to provide a method of forming a non-skid coated substrate, comprising: providing a material for making non-skid coatings, comprising: particulate composition, the particulate composition comprising wollastonite particles, cellulose particles, and diatomaceous earth particles, providing liquid composition comprises water, fungicide, defoamer, ultra-violet light absorber and polymeric material, mixing the particulate composition and the liquid composition to form a coating composition, coating the coating composition onto a surface of a substrate to form a non-skid coated substrate.

Diatomaceous earth as used herein refers to diatomite material, which is composed of the skeletons of small prehistoric aquatic plants related to algae (diatoms). Diatomaceous earth has the chemical name, silicon dioxide (silica) and chemical formula: $SiO_2$.

Diatomaceous earth particles as used herein preferably refers to particles of diatomaceous earth, preferably having a particle size less than 10 mesh and greater than 100 mesh.

Wollastonite as used herein refers to material having the chemical formula $CaSiO_3$ particularly as naturally occurring in metamorphic rocks.

Wollastonite particles as used herein preferably refers to particles of wollastonite having a particle size less than 10 mesh and greater than 100 mesh.

Cellulosic as used herein refers to cellulose and materials derived from cellulose, such as hydrated cellulose.

Cellulosic particles as used herein preferably refers to particles of cellulosic material. Cellulosic particles preferably are in the form of fibers having an average fiber length between 600 and 300 micrometers and are at least 80 percent retained by a 400 mesh screen.

Non-skid coating as used herein refers to a coating which provides slip resistance because of peaks in the coating surface. Each peak forms over one or more particles.

BRIEF DESCRIPTION OF THE INVENTION

The invention provides a material for making non-skid coatings, comprising: a particulate composition including wollastonite particles, cellulose particles, and diatomaceous earth particles. Preferably the cellulose particles comprise fibers. Preferably the material further comprising a liquid composition, and the liquid composition is mixed with the particulate composition. Preferably the liquid composition comprises water and polymeric material. Preferably the liquid composition comprises water, fungicide, defoamer, ultra-violet light absorber and polymeric material. Preferably the wollastonite particles have a particle size less than 10 mesh. Preferably the at least 50 percent by weight of the wollastonite particles have a particle size greater than 100 mesh. Preferably the particulate composition comprises from 2 to 70 percent by weight of wollastonite particles, from 0.1 to 25 percent by weight of cellulose particles, and from 30 to 95 percent by weight of diatomaceous earth particles. More preferably the particulate composition comprises from 5 to 30 percent by weight of wollastonite particles, from 0.5 to 10 percent by weight of cellulose particles, and from 40 to 90 percent by weight of diatomaceous earth particles. Preferably the material is coated onto a surface comprising wood, metal, glass or ceramic. Preferably the liquid composition further comprises a polymerizable compound. Preferably the liquid composition further comprises a paint or varnish.

The invention provides a method of forming a non-skid coated substrate, comprising: providing a material for making non-skid coatings, comprising: particulate composition, the particulate composition comprising wollastonite particles, cellulose particles, and diatomaceous earth particles, providing liquid composition comprises water, fungicide, defoamer, ultra-violet light absorber and polymeric material, mixing the particulate composition and the liquid composition to form a coating composition, coating the coating composition onto a surface of a substrate to form a non-skid coated substrate. Preferably the substrate surface comprises wood, metal, glass or ceramic.

DETAILED DESCRIPTION OF THE INVENTION

Compositions of the invention are used to provide superior non-skid surfaces, such as non-skid flooring surfaces. The invention provides a material for making non-skid coatings, including a particulate composition including wollastonite particles, cellulose particles, and diatomaceous earth particles. While not wanting to be bound by any particular theory of the operation and/or interaction it is believed that the particles in use in accordance with the invention include diatomaceous earth particles adhering to the wollastonite particles and to the cellulose particles forming clusters of particles, and these clusters form a colloidial suspension on the liquid composition. In use as non-skid flooring surfaces being walked on by pedestrians and/or driven on by motor vehicles, such as automobiles and trucks, the diatomaceous earth particles are worn from material of the invention long before the wollastonite particles. Thus, for example, a wood, metal, glass or ceramic substrate surface is stepped on and/or stood on daily by at least 100 pedestrians having weights ranging from 50 to 300 pound for six months and a greater portion of the diatomaceous earth particles than wollastonite particles are worn from the material. The surface coated with material in accordance with the invention retains non-skid and/or slip resistance for at least six months, and more preferably for at least one year.

Preferably the cellulose particles comprise fibers. Preferably the material further comprising a liquid composition, and the liquid composition is mixed with the particulate composition. Preferably the liquid composition comprises water and polymeric material. Preferably the liquid composition comprises water, fungicide, defoamer, ultra-violet light absorber and polymeric material. Preferably the wollastonite particles have a particle size less than 10 mesh. Preferably the at least 50 percent by weight of the wollastonite particles have a particle size greater than 100 mesh. Preferably the particulate composition comprises from 2 to 70 percent by weight of wollastonite particles, from 0.1 to 25 percent by weight of cellulose particles, and from 30 to 95 percent by weight of diatomaceous earth particles. More preferably the particulate composition comprises from 5 to 30 percent by weight of wollastonite particles, from 0.5 to 10 percent by weight of cellulose particles, and from 40 to 90 percent by weight of diatomaceous earth particles. Preferably the material is coated onto a surface comprising wood, metal, glass or ceramic. Preferably the liquid composition further comprises a polymerizable compound. Preferably the liquid composition further comprises a paint or varnish.

The invention provides a method of forming a non-skid coated substrate, comprising: providing a material for making non-skid coatings, comprising: particulate composition, the particulate composition comprising wollastonite particles, cellulose particles, and diatomaceous earth particles, providing liquid composition comprises water, fungicide, defoamer, ultra-violet light absorber and polymeric material, mixing the particulate composition and the liquid composition to form a coating composition, coating the coating composition onto a surface of a substrate to form a non-skid coated substrate. Preferably the substrate surface comprises wood, metal, glass, masonry, stucco or ceramic.

EXAMPLE 1

A particulate composition for making non-skid coatings is formed by mixing 116.2 grams of wollastonite particles, 23.8 grams of cellulose particles, and 462.8 grams of diatomaceous earth particles for 30 minutes to form a particulate composition having a substantially uniformly distributed particulate mixture.

EXAMPLE 2

A liquid composition for making non-skid coatings is formed by adding to a mix tank 5.5 grams of 2[(hydroxymethyl)amino]ethanol (a fungicide) to 803.9 grams of water. Then adding 2837.2 grams of urethane polymer (FLEXTHANE urethane hybrid polymer base material sold by Air Products FLEXTHANE 610, 620, 630, 791 and others may be used) and mixing for 15 minutes.

In a separate container forming a premix by adding while stirring 142.3 grams of tripropylene glycol monomethyl ether also known as propanol, (2(2-methoxymethyethoxy) Methylethoxy), (ARCOSOLV TPM sold by ARCO Chemical Company), 142.3 grams of propoxy propoxy butanol also known as dipropylene glycol butoxy ether, (ARCOSOLV DPNB sold by ARCO Chemical Company), 27.6 grams of Poly(oxy-1,2-ethanediyl),.alpha.-[3-[3-(2H-benzotriazol-2-yl)-5-(1,1-dimethylethylethyl)-4-hydroxyphenyl]-1-oxopropyl]-.omega.-[3-[3-(2H-benzotriazol-2-yl)-5-(1,1-dimethylethyl)-4-hydroxyphenyl]-1- oxopropoxy]; Poly(oxy-1,2-ethanediyl),.alpha.-[3-[3-(2H-benzotriazol-2-yl)-5-(1,1-dimethylethylethyl)-4-hydroxyphenyl]-1-oxopropyl]-.omega.-hydroxy-; Polyethylene glycol (TINUVIN 1130, UV absorber, SOLD BY CIBA-GEIGY CORPORATION), 14.2 grams of bis(1,2,2,6,6-pentamethyl-4-piperidinyl)sebacate; Methyl(1,2,2,6,6-pentamethyl-4-piperidinyl)sebacate (TINUVIN 292, a light stabilizer, SOLD BY CIBA-GEIGY CORPORATION), 22.9 grams of defoamer (BYK-346, a mixture of hydrophobic solids, emulsifiers and foam destroying polysiloxanes in polyglycol, sold by BYK-Chemie U.S.A.), and 2.7 grams of defoamer (BYK-022, a mixture of hydrophobic solids, emulsifiers and foam destroying polysiloxanes in polyglycol, sold by BYK-Chemie U.S.A.).

The premix is then added to the mix tank and mixing is continued for an additional 50 minutes at 212° F. (100° C.). Then 11.8 grams of 3-Iodo-2-propynyl butyl carbamate (Troysan polyphase P-20T, a fungicide, sold by TROY corporation) is added to the mix tank and mixing is continued for an additional 20 minutes at 212° F. (100° C.) to form a liquid composition for making non-skid coatings.

EXAMPLE 3

The particulate composition formed in Example 1 is added to the liquid composition formed in Example 2 in the mix tank and mixing is continued for an additional 30 minutes at 212° F. (100° C.) to form a material for making non-skid coatings.

EXAMPLE 4

The material for making non-skid coatings formed as described in Example 3 is brushed onto a wood surface and hardens to form a non-skid coating on the wood.

EXAMPLE 5

The material for making non-skid coatings formed as described in Example 3 is brushed onto a metal surface and hardens to form a non-skid coating on the metal.

EXAMPLE 6

The material for making non-skid coatings formed in Example 3 is brushed onto a glass surface and hardens to form a non-skid coating on the glass.

EXAMPLE 7

The material for making non-skid coatings formed as described in Example 3 is mixed with an equal mass of latex paint and brushed onto a ceramic surface and hardens to form a non-skid coating on the ceramic.

EXAMPLE 8

The material for making non-skid coatings formed as described in Example 3 is mixed with an equal mass of varnish and brushed onto a wood surface and hardens to form a non-skid coating on the wood.

It should be understood that while the present invention has been described in considerable detail with respect to certain specific embodiments thereof, it should not be considered limited to such embodiments but may be used in other ways without departure from the spirit of the invention and the scope of the appended claims.

What is claimed is:

1. A material for making non-skid coatings, comprising:
   a particulate composition, said particulate composition consisting essentially of from 2 to 70 percent by weight of wollastonite particles, from 0.1 to 25 percent by weight of cellulose particles, and from 30 to 95 percent by weight of diatomaceous earth particles.

2. The material of claim 1 wherein said cellulose particles comprise cellulose fibers.

3. The material of claim 1 wherein said material further comprises liquid, said liquid comprising sufficient water and urethane polymer to readily coat said material on a substrate by brushing to form a non-skid coated substrate.

4. The material of claim 1 wherein said material further comprises liquid, said liquid comprising sufficient urethane polymer to form a non-skid coating by brushing said material on a substrate.

5. The material of claim 3 wherein said liquid further comprises a sufficient amount of defoamer to reduce foam.

6. The material of claim 3 wherein said liquid further comprises a sufficient amount of ultra-violet light absorber to absorb ultra-violet light.

7. The material of claim 1 wherein said wollastonite particles have a particle size less than 10 mesh.

8. The material of claim 1 wherein at least 50 percent by weight of said wollastonite particles have a particle size greater than 100 mesh.

9. The material of claim 1 wherein said particulate composition consists essentially of from 5 to 30 percent by weight of wollastonite particles, from 0.5 to 10 percent by weight of cellulose particles, and from 40 to 90 percent by weight of diatomaceous earth particles.

10. The material of claim 4 wherein said substrate is wood, metal, glass or ceramic.

11. The material of claim 3 wherein said liquid is a paint or varnish.

12. A method of forming a non-skid coating on a substrate, comprising:

provideing a particulate composition, said particulate composition comprising from 5 to 30 percent by weight of wollastonite particles, from 0.5 to 10 percent by weight of cellulosic particles, and from 40 to 90 percent by weight of diatomaceous earth particles;

forming a coating composition by mixing said particulate composition, with a liquid;

said liquid comprising sufficient water and urethane polymer to readily coat said particulate composition on a substrate by brushing, and;

coating said coating composition onto a surface of a substrate to form a non-skid coating on said substrate.

13. The method of claim 12 wherein said substrate comprises wood, metal, glass or ceramic.

14. The method of claim 12 wherein said coating composition comprises a colloidial suspension of clusters;

said clusters comprising said diatomaceous earth particles adhering to said wollastonite particles and to said cellulosic particles.

15. The method of claim 12 wherein said cellulosic particles comprise cellulose fibers.

16. A method of forming a non-skid coating on a surface, comprising;

providing a particulate composition, said particulate composition comprising from 5 to 30 percent by weight of wollastonite particles, from 0.5 to 10 percent by weight of cellulose particles, and from 40 to 90 percent by weight of diatomaceous earth particles;

forming a coating composition by mixing said particulate composition with a liquid;

said liquid comprising sufficient water and urethane polymer to readily coat said particulate composition on a surface by brushing, and;

brushing said coating composition onto a wood, metal, glass or ceramic surface to form a non-skid coating on said surface.

* * * * *